United States Patent [19]

Derschmidt et al.

[11] 4,201,515

[45] May 6, 1980

[54] ROTOR WITHOUT FLAPPING HINGES AND WITHOUT LEAD-LAG HINGES

[75] Inventors: Hans Derschmidt, Putzbrunn; Hermann Sahlstorfer, Ottobrunn, both of Fed. Rep. of Germany

[73] Assignee: Messerschmitt-Bolkow-Blohm GmbH, Munich, Fed. Rep. of Germany

[21] Appl. No.: 923,339

[22] Filed: Jul. 10, 1978

[30] Foreign Application Priority Data

Jul. 22, 1977 [DE] Fed. Rep. of Germany ....... 2733101

[51] Int. Cl.² .............. B64C 11/12; B64C 11/48; F16D 3/00; B64C 27/48
[52] U.S. Cl. .................. 416/134 A; 416/141; 403/291
[58] Field of Search ............. 416/134 A, 138 A, 141; 403/220, 291

[56] References Cited

U.S. PATENT DOCUMENTS

| | | | |
|---|---|---|---|
| 3,669,566 | 6/1972 | Bourquardez et al. | 416/134 A |
| 3,695,779 | 10/1972 | Kastan et al. | 416/141 |
| 3,879,153 | 4/1975 | Breuner | 416/141 |
| 3,880,551 | 4/1975 | Kisovec | 416/141 |
| 3,893,788 | 7/1975 | Ditlinger | 416/134 A |
| 4,038,885 | 8/1977 | Jonda | 416/134 A |

FOREIGN PATENT DOCUMENTS

| | | | |
|---|---|---|---|
| 1334446 | 7/1963 | France | 416/141 |
| 1564092 | 3/1969 | France | 416/138 A |

Primary Examiner—John J. Vrablik
Attorney, Agent, or Firm—W. G. Fasse; D. F. Gould

[57] ABSTRACT

A rotor, especially for rotary wing aircraft, is constructed without flapping hinges and without lead-lag hinges. The rotor comprises a rigid rotor head and rotor blades secured to the rotor head by flexible coupling rods, for example, made of fiber reinforced composite material. One end of each rod is secured to the rotor head. The other end of each rod is secured to the root of the respective rotor blade. The rods are so arranged that their central longitudinal axes coincide with a generatrix of two coaxial cones having a central axis. One of the cones is located with its base in the respective rotor blade while the other cone is located with its base in the rotor head. This type of structure is surprisingly simple, yet capable of transferring substantial forces between the rotor head on the one hand and the rotor blades on the other hand.

9 Claims, 8 Drawing Figures

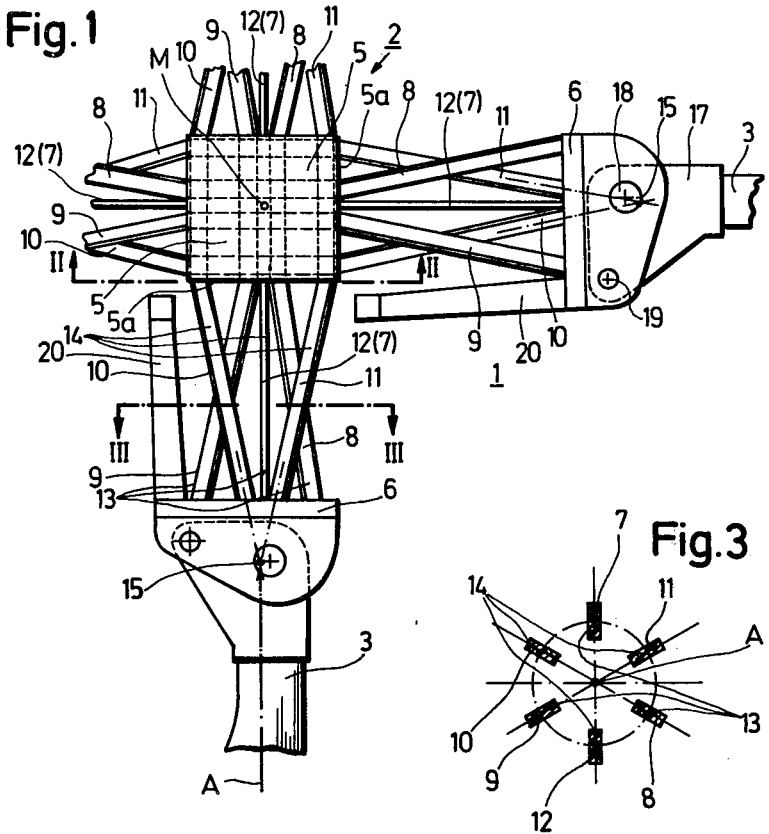
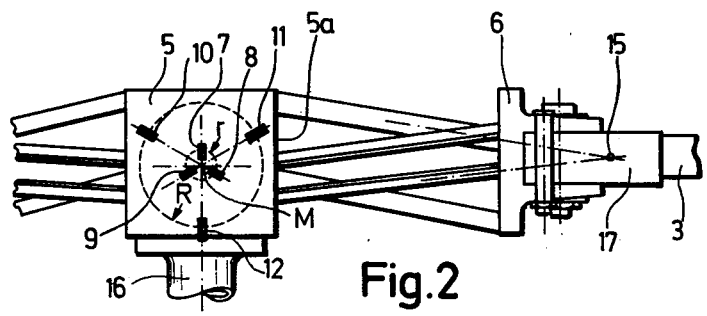

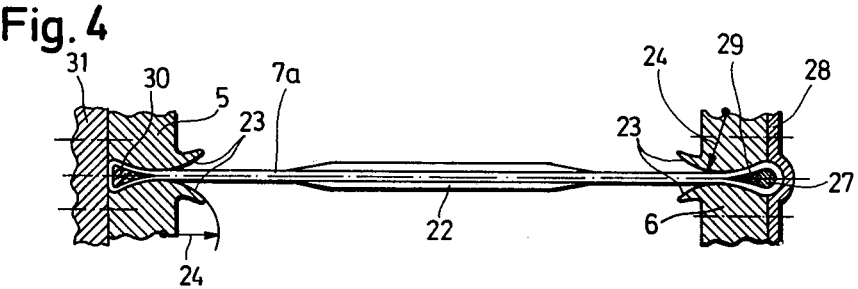
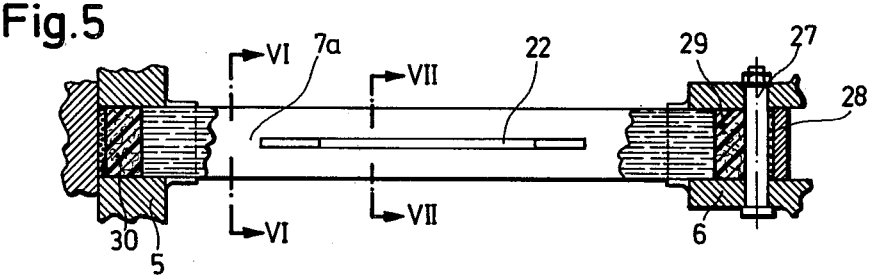
 
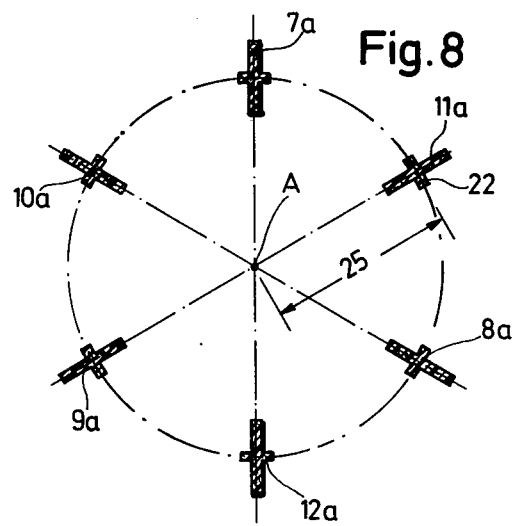

ROTOR WITHOUT FLAPPING HINGES AND WITHOUT LEAD-LAG HINGES

BACKGROUND OF THE INVENTION

The present invention relates to a rotor without flapping hinges and without lead-lag hinges, especially for rotary wing aircraft, wherein the rotor blades are coupled in a flexible manner to a rigid rotor head center member.

U.S. Pat. No. 3,880,551 discloses a rotor of the just mentioned type, wherein the normally employed bearing means for coupling the rotor blades to the rotor head center member are avoided along with the disadvantages involved in such bearing type of coupling. In the rotor according to said U.S. patent, two oppositely arranged rotor blades are connected by a carrier band which is clamped between flexible bridging bars arranged in a cross direction. This arrangement is apparently not suitable for taking up larger forces and moments because this type of prior art structure has been used especially in connection with the tail rotors of a helicopter or rotary wing aircraft.

OBJECTS OF THE INVENTION

In view of the foregoing it is aim of the invention to achieve the following objects singly or in combination:

to provide a rotor structure for a rotary wing aircraft or the like which is capable of transmitting even larger forces from the rotor blades to the rotor head central section by means of simple, yet sufficiently strong force transmitting components;

to construct the rotor blade connecting rods in such a manner that they require but small reset moments;

to minimize the number of rods needed for connecting a rotor blade to the rotor head;

to construct the rods which interconnect the rotor blades with the rotor head from fiber reinforced compound or composite materials; and to arrange the interconnecting rods in such a manner that they are located along a generatrix of cones having a common central axis.

SUMMARY OF THE INVENTION

The foregoing objectives have been achieved according to the invention by a rotor without flapping hinges and without lead-lag hinges, especially for rotary wing aircraft, wherein flexible coupling means secure the rotor blades to the rigid rotor head center. The flexible coupling means comprise a plurality of rods which are flexible relative to bending and torsion leads and each of which has a central longitudinal axis. One end of the flexible rods is secured to the rotor blade and the other end of each flexible rod is connected to the rigid rotor head center. The rods forming a coupling between the blades and the rotor head center are so arranged that their central longitudinal axes coincide with a generatrix of two coaxial cones having a central axis, preferably a common central axis. One of said cones has its base in the respective rotor blade while the other cone has its base in the respective rotor head center. The just described surprisingly simple arrangement achieves the advantage that the rods which take up the elastic deformation of the rotor blades when the latter are twisted, exhibit only small reset moments while simultaneously having a high bending stiffness or resistance in the flapping and tilting direction. Further, by using a rigid, directly effective blade angle control lever a merely small flap-pitch coupling is effective. Thus, a sufficient damping is accomplished for the control or steering of the blades. These advantages are achieved according to the invention while simultaneously maintaining a relatively small structural length of the above mentioned cones, which length does not need to be larger than in rotor heads equipped with bearings.

BRIEF FIGURE DESCRIPTION

In order that the invention may be clearly understood, it will now be described, by way of example, with reference to the accompanying drawings, wherein:

FIG. 1 is a partial top plan view of a rotor structure according to the invention;

FIG. 2 is a partial side view of the rotor according to FIG. 1, partially in section along the section line II—II;

FIG. 3 is a sectional view through the coupling rods along the section line III—III in FIG. 1;

FIG. 4 illustrates a side view of a coupling rod and a sectional view of the connecting points of the coupling rod to the rotor blade and to the rotor head center member;

FIG. 5 shows a top plan view of the coupling rod according to FIG. 4 with the connecting points also being shown in section;

FIG. 6 is a sectional view through the coupling rod along the section line VI—VI in FIG. 5;

FIG. 7 is a sectional view through the coupling rod along the section lines VII—VII in FIG. 5; and FIG. 8 is a section similar to that of FIG. 3, but illustrating a cross-sectional shape for a coupling rod as shown in FIG. 4.

DETAILED DESCRIPTION OF PREFERRED EXAMPLE EMBODIMENTS

FIGS. 1 to 3 illustrate a rotor 1 without any hinges, namely, without flapping hinges, without lead-lag hinges and without any pitch hinges. The rotor 1 comprises the rotor head 2 and four rotor blades 3. Only two rotor blades are shown partially for simplicity's sake. The rotor head 2 comprises a cube-shaped rotor head center member 5 which is connected to the blade fork hardware 6 by means of six rods 7, 8, 9, 10, 11, and 12 provided between each blade root and the rotor head center member 5. The rods 7 to 12 are constructed to have the most simple shape, namely narrow right angle cross sections, whereby the center lines of these rods 7, 8, 9, 10, 11, and 12, please see FIG. 3, extend in such a manner that their extensions merge in a point or points located on the blade angle adjustment axis A.

The rods 7 to 9 on the one hand and the rods 10 to 12 on the other hand form two coaxial cones 13 and 14 of equal size, whereby the above mentioned center lines extend along generatrix lines of the respective cones 13, 14. The cones 13 have their base at the surfaces of the respective blade fork hardware 6. The tip of these cones 13 coincides with the center M of the rotor head center member 5. The cones 14 have their base on the respective surface area 5a of the rotor head center member 5 and the tips of the cones 14 merge in respective points 15 of the blade angle adjustment axis A. The base areas of the cones 13 and 14 at the respective rotor head center member side surface 5a and at the fork hardware 6 have the same radii R. Similarly, the same radii "r" appear at the surface where the respective cone penetrates through the fork hardware 6 and the side face 5a of the rotor head center member 5, please see FIG. 2.

The rods 7 to 12 are preferably made of uni-directional, fiber reinforced composite or compound material, especially fiber reinforced synthetic material. Such material has been found to be very reliable in taking up the loads that occur in hingeless rotors. Depending upon the type of loads that may occur, the reinforcing fibers may, for example, be of glass, especially S-glass or of carbon, or of synthetic fibers such as KEVLAR (registered trademark). The matrix in which the reinforcing fibers are embedded may suitably be an epoxy resin.

The rods 7 to 12 are rigidly clamped at their radially outer ends in the blade fork hardware 6. The opposite ends adjacent to the rotor head center member 5 may be held at the surfaces 5a or below these surfaces 5a. In a still further embodiment, as shown in FIG. 1, the congruent rods which interconnect respectively opposite rotor blades, extend through the rotor head center member 5 so that the entire rotor head comprises only twelve rods extending through the rotor head center member 5, whereby each rod forms an uninterrupted double rod. In this embodiment, as shown in FIG. 1, the rods 7 to 12 are clamped in their straight center sections extending through the rotor head center member 5.

The rotor head center member 5 is rigidly secured to a rotor shaft 16. The radially inner ends or roots of the rotor blades 3 are held in a conventional manner by rotor neck hardware elements 17 which are supported in the blade fork hardware 6 by means of bolts 18 and 19. Further, rigid blade angle levers 20 are secured to the blade fork hardware 6. The control of the blade angle is accomplished by connecting to the free ends of the rigid levers 20 rotating control rods of conventional construction not shown.

FIGS. 4 to 8 illustrate a further embodiment of the rods that may be used according to the invention. Only one rod 7a is shown in FIGS. 4 to 7 for simplicity's sake. FIGS. 4 and 5 also show ways of connecting the ends of the rods to the blade fork hardware 6 and to the rotor head center member 5. The rod 7a comprises reinforcing ribs 22 extending along a substantial center portion intermediate the ends of the rods. The ribs 22 provide the rods with a cross shaped cross section as best seen in FIGS. 7 and 8, whereby the rods are stiffened against buckling so that they may take up larger pressure forces. However, the rods 7a and the ribs 22 have a small thickness, whereby the stiffness against torsion loads of the rod is altogether small. Toward the ends of the rods the ribs 22 diminish in their width, whereby the rods 7a attains a rectangular cross section at its ends as shown in FIG. 6.

FIG. 8 shows a sectional view corresponding substantially to the section line III—III in FIG. 1, however, through an embodiment comprising the rods 7a to 12a having a cross shaped cross section. FIG. 8 shows that the ribs 22 have a relatively large spacing 25 from the blade angle adjustment axis A. By this feature the stiffness against bending of the blade support structure by the rods is relatively large although the rods themselves have only a small individual stiffness against bending loads.

The clamping locations of the rod 7a comprise at the rotor head center member 5 as well as at the blade fork hardware 6 recesses with goblet shaped openings 23 having radii 24. This feature prevents at the clamping locations the formation of an excessive bending around two small radii, thereby also avoiding too large bending loads. FIGS. 4 and 5 show two form locking clamping embodiments of the rod 7a. The clamping arrangement at the blade fork hardware 6 is such that the fibers of the rod 7a loop around a bolt 27. Outside of the clamping location proper there is arranged a shaped cover 28 which is secured, for example, by screws to the blade fork hardware 6 for taking up pressure forces. Inside the loop formed by the fiber layers of the rod 7a there is arranged a wedge shaped insert 29. The insert makes it possible in conjunction with a corresponding counter contour in the blade fork hardware 6 to provide a form locking clamping capable of taking up bending moments. The clamping of the rod 7a in the rotor head center member 5 is accomplished by looping the fibers of the rod around a wedge shaped member 30, whereby the rod 7a is secured against tension loads. A cover member 31 again takes up the pressure forces effective on the clamping arrangement.

The function of the elastic rods 7 to 12 will now be described with reference to the practical operation of a hingeless rotor, that is, a rotor without flapping hinges and without lead-lag hinges. If the rotor blade 3 with its blade fork hardware 6 is rotated or twisted to change its pitch angle relative to the central rotor head center member 5, it is necessary that the elastic rods 7 to 12 are all twisted by the same pitch angle. Due to the small torsion resistance of the rod such twisting is possible with small restoring or resetting moments. In addition, it is necessary that all rods perform a sine-shaped bending deformation which depends in its size from the pitch angle and the size of the small radius "r" of the clamping locations 23 adjacent the tips of the cones 13 and 14. This radius "r" is relatively small. Further, the bending stiffness of the rods 7 to 12 adjacent to the clamping locations 23 were the most pronounced bends of the sine shape occur, is also small. For these two reasons, only a small restoring moment is necessary for these bending deformations of the rods 7 to 12. The largest proportion of the restoring moments results in this type of arrangement from the elastic elements according to the invention due to the large longitudinal forces by means of which the rotor blades 3 must be held in the direction of the blade angle adjustment axis A. This large proportion of the restoring moment is proportional to the radius "r" at the clamping location 23, whereby it is relatively small.

Due to the large angle which is enclosed by the elastic rods, the latter form a spacial truss work capable of transmitting larger cross forces which simultaneously cause small deformations in the direction in which these cross forces are effective.

Due to the relatively large spacing 25 which the individual cross sections of the rods have from the blade angle adjustment axis A, the bending stiffness of the blade support in the flapping direction as well as in the lead-lag direction of the blades is so large that the flapping and lead-lag deformations take place primarily at the rotor blades and not at the elastic support structure comprising the rods 7 to 12. Therefore, it is possible to accomplish the blade angle control without any restoring control effects worth mentioning. Thus, such control may be directly accomplished by means of the blade angle levers 20 secured to the blade fork angle hardware 6. The hingeless rotor according to the invention in which the coupling of the rotor blades to the center member 5 of the rotor head is accomplished without any flapping hinges, without any lead-lag hinges and without any pitch hinges, may also be used with the same advantages for the coupling of propeller blades to the propeller hub. The above mentioned advantages are even more pronounced, where the two cones 13 and 14 have each a base of equal surface size, and where the tip of the cone extending from the rotor blade coincides with the center of the rotor head center member 5, while the cone axes coincide with the blade angle adjustment axis A.

Another large advantage of the invention is accomplished due to the possibility of using a small number of rods 7 to 12 which form the mentioned cones 13 and 14 while simultaneously having a very simple structure. According to the invention it is possible to use for each cone but three rods, whereby the rods may end at the rotor head center member 5 or they may form congruent double rods which interconnect two rotor blades arrranged opposite each other, such congruent double rods being formed from one integral piece of stock which extends through the rotor head center member 5.

Although the invention has been described with reference to to specific example embodiments, it will be appreciated, that it is intended to cover all modifications and equivalents within the scope of the appended claims.

We claim:

1. A rotor without flapping hinges and without lead-lag hinges, especially for rotary wing aircraft, comprising rigid rotor head center means having a center (M), a plurality of rotor blade means, flexible coupling means securing said rotor blade means to said rigid rotor head center means, said flexible coupling means comprising for each rotor blade means a plurality of rod means made of fiber reinforced composite material, said rod means being flexible relative to bending and torsion loads, each of said rod means having a central longitudinal axis, said rod means connecting each of said rotor blade means to said rotor head center means, first means securing said rod means to said blade means, and second means securing said rod means to said rotor head center means, said rod means forming first and second cones for each rotor blade means, said rod means being so arranged that their central longitudinal axes coincide with a generatrix of said first and second cones which have a common central cone axis, all of said first cones having their base in the respective rotor blade means, all of said second cones having their base in said rotor head center means all of said first cones having their tips substantially in said center (M) of said rotor head center means.

2. The rotor of claim 1, wherein each base of each of said first and second coaxial cones has the same area size.

3. The rotor of claim 1, wherein said rotor blade means comprise a blade angle adjustment axis which coincides with the central axis of the respective cones.

4. The rotor of claim 1, wherein each cone comprises at least three of said rod means.

5. The rotor of claim 1, wherein said rod means terminate in said rotor head center means.

6. The rotor of claim 1, wherein said rod means comprise congruent counterpart rod members on each side of said rotor head center means, whereby two rod members from an integral rod structure extending through said rotor head center means.

7. The rotor of claim 1, wherein said rod means have a rectangular cross-section along their entire length, said cross-section having a wide side and a narrow side, said rotor blade means having a blade angle adjustment axis, said central longitudinal axes of said rod means merging into a common point located on said blade angle adjustment axis.

8. The rotor of claim 1, wherein said rod means comprise reinforcement means located intermediate said rotor head center means and said rotor blade means.

9. The rotor of claim 1, wherein said first and second securing means comprise central holding means located at each end of said rod means, said rod means being looped around said central holding means at said rotor blade means and at said rotor head center means.

* * * * *